United States Patent [19]
Mattison et al.

[11] Patent Number: 5,454,917
[45] Date of Patent: Oct. 3, 1995

[54] APPARATUS AND PROCESS FOR RECOVERING METAL FROM AN AQUEOUS SOLUTION

[75] Inventors: Phillip L. Mattison; William E. Friestad, both of Santa Rosa, Calif.; John Fast, Littleton, Colo.

[73] Assignee: Cognis, Inc., Santa Rosa, Calif.

[21] Appl. No.: 116,839

[22] Filed: Sep. 3, 1993

[51] Int. Cl.$^6$ .................................................. C02F 1/461
[52] U.S. Cl. .................. 204/150; 204/248; 204/249; 204/257; 204/258; 204/275; 204/277
[58] Field of Search ....................... 204/150, 248, 204/249, 257, 258, 275, 277

[56] References Cited

U.S. PATENT DOCUMENTS

| | | | |
|---|---|---|---|
| 4,152,229 | 5/1979 | Soltys et al. | 204/150 |
| 4,212,722 | 7/1980 | Avedesian et al. | 204/222 |
| 4,525,254 | 6/1985 | Feofanov et al. | 204/150 |
| 4,749,457 | 6/1988 | Yasuda et al. | 204/150 |
| 4,787,757 | 11/1988 | Nelson et al. | 209/159 |

FOREIGN PATENT DOCUMENTS

| | | |
|---|---|---|
| 278328 | 8/1988 | European Pat. Off. . |
| 402737 | 12/1990 | European Pat. Off. . |

OTHER PUBLICATIONS

Chemiker–Zeitung, 106, Jahrgang (1982); pp. 289–292 (abstract) [no month].

*Primary Examiner*—John Niebling
*Assistant Examiner*—Arun S. Phasge
*Attorney, Agent, or Firm*—Ernest G. Szoke; Wayne C. Jaeschke; Daniel S. Ortiz

[57] ABSTRACT

The invention is an apparatus and process for recovering metal from a solution. This apparatus is a structure having an anode formed from a plurality of reducing metal elements and a cathode formed from a high surface area electrically conductive material such as metal wire. The reducing metal elements of the anode have a more negative standard state reduction potential than the metal to be recovered. This invention is also a process in which a metal is recovered by contacting a solution of a metal to be recovered with the apparatus of the invention.

36 Claims, 4 Drawing Sheets

APPARATUS AND PROCESS FOR RECOVERING METAL FROM AN AQUEOUS SOLUTION

FIELD OF THE INVENTION

The invention is an apparatus and process for recovering metal from an aqueous solution containing ions of the metal.

BACKGROUND OF THE INVENTION

Cementation processes are known for recovering metal from aqueous solutions containing ions of the metal. In the cementation process, metal, referred to as the reducing metal, having a more negative standard state reduction potential than the metal to be recovered is contacted with the solution containing ions of the metal to be recovered. The recovered metal precipitates from solution onto the surface of the reducing metal, and the reducing metal enters into solution. Cementation, however, has some serious disadvantages for practical operation. Firstly, to obtain substantial removal of metal in a reasonably short time, the solution must be agitated to assure intimate exposure of the metal ions to the reducing metal surface. Since the reducing metal is generally present as pieces with relatively large dimensions, such as nuggets, shot, or pieces of scrap, it is difficult or impractical to suspend the reducing metal in the solution. Simply allowing the solution to flow over or up through the reducing metal pieces leads to channeling and short-circuiting, or requires an extremely large excess of reducing metal to obtain substantial removal of the metal in solution. Secondly, if only small beads or granules of the reducing metal are used, to allow easier suspension by agitation and to provide higher surface area for reduction, it becomes difficult to physically separate the precipitated metal from the diminishingly small particles of reducing metal.

Another known method for removing metal from solution is electrowinning, wherein a direct current is applied across the anodes and cathodes, precipitating the metal to be removed at the cathode. However, this method has the disadvantage that direct current must be provided by an expensive rectifier. Furthermore, the required oxidation reaction at the anode adds substantially to the power required to operate the electrowinning cell. This reaction is typically the formation of oxygen from water. But in a frequently occurring situation, where chloride ion is present, the undesireable side reaction of chloride oxidation can take place, leading to the formation of toxic chlorine gas.

It would be possible to afix pieces of reducing metal having high surface area, such as screens or thin sheets, in a vessel containing the solution of the metal to be recovered, and the metal would rapidly precipitate out as the solution is pumped through the vessel, providing high recovery rates of the metal. But the pieces of reducing metal would also dissolve, rapidly losing the very surface area that was the source of the high recovery rates. Since high surface area reducing metal is expensive, as would be the maintenance cost of frequently replacing it, this cementation system is not an attractive option. Alternatively, if larger pieces of reducing metal are used so that they last longer, they do not provide the high surface area needed for rapid removal rates.

It would be desireable to have a metal recovery apparatus and process which (1) does not require intensive agitation to give intimate contact of the solution with the reducing surface, but simply requires gentle pumping of the solution through the apparatus, (2) does not require rectified direct current and does not generate chlorine gas, (3) gives rapid removal of metal from solution, and (4) requires minimal maintenance and operator attention.

The present invention provides an apparatus and process in which the metal is recovered at a different portion of the apparatus than where the reducing metal is passing into solution. It provides a high surface area for efficient removal of metal without requiring high surface area reducing metal. The apparatus provides for rapid removal of the metal from the solution, without the need for frequent replacement of the reducing metal. The apparatus also provides means by which the recovered metal can be rapidly separated from the solution.

BRIEF DESCRIPTION OF THE INVENTION

According to the present invention an apparatus for recovering metal from aqueous solution containing ions of the metal to be recovered comprises a metal recovery assembly comprising an anode comprising a plurality of metal elements, referred to herein as reducing metal elements, having a more negative standard state reduction potential than the metal to be recovered, arranged adjacent to and in electrical communication with a cathode comprising a high surface area electrically conductive material having a more positive standard state reduction potential than the reducing metal comprising the elements.

The reducing metal elements comprise a shaped metal material which may be in the form of bars, plates, or other fabricated forms which provide a high volume of the metal. Round bars, star shaped bars, square or rectangular bars and the like can be utilized as the reducing metal elements. The plurality of reducing metal elements are arranged adjacent to and in electrical communication with the high surface area electrically conductive material. The high surface area conductive material is fabricated from a conductive material which has a more positive standard state reduction potential than the reducing metal elements. The high surface area electrically conductive materials can be in the form of gauze, mesh, net, screen or the like fabricated from wire, filaments or roping of the conductive material, preferably stainless steel. The high surface area electrically conductive material can also be fabricated in the form of thin plates which are arranged parallel to each other with flow channels between the plates. The electrically conductive material can also be formed as an open honeycomb or open cell structure having a large surface for contact with the aqueous solution containing the ions of the metal to be recovered.

In operation, the apparatus is placed in contact with the aqueous solution containing the ions of the metal to be recovered. When in contact with the aqueous solution, the metal of the reducing metal elements, having a more negative standard state reduction potential than the metal to be recovered, passes into the aqueous solution and the ions of metal to be recovered are precipitated on the high surface area electrically conductive material or on the metal elements. The arrangement overcomes a major problem in recovering the metal from the solution in that a major portion of the metal to be recovered precipitates rapidly on the high surface area conductive material and permits operation with infrequent replacement of the reducing metal elements.

DETAILED DESCRIPTION OF THE INVENTION

Figure 1:
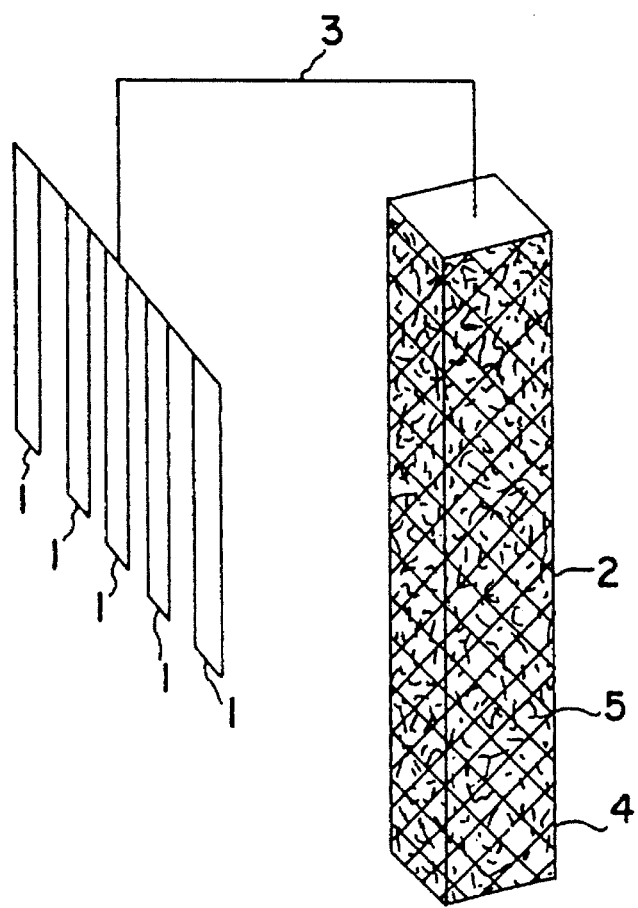
FIG. 1 is diagrammatic representation of the apparatus of the invention.

FIG. 1 is a diagrammatic representation of a metal recovery assembly of the invention. In FIG. 1, 1 represents a plurality of reducing metal elements. The plurality of reducing metal elements are in electrical communication through electrical connection 3 to high surface area electrically conductive material 2. The electrically conductive material 2 comprises a shape retaining member 4 which is open for circulation of the aqueous fluid. A packing material 5 is arranged in the shape retaining member 4. The packing 5 can be a high surface area open material of a more positive standard state reduction potential than the metal comprising the elements. Packing 5 can be a wire mesh, a wire gauze, woven screening material or the like.

The high surface area electrically conductive material must have an open structure to permit the aqueous solution to contact the surface and circulate across the surface of the electrically conductive material. In addition, the construction must be open so that the precipitated metal can be readily removed from the surfaces of the high surface area electrically conductive material. An assembly which is particularly useful for recovering lead from an acidic solution containing lead ions comprises a plurality of aluminum reducing metal elements adjacent to and in electrical communication with a high surface area electrically conductive material comprising stainless steel wire mesh, screen, or gauze. As used herein in reference to the cathode material, high surface area means a structure having a surface area of at least 20 square meters per cubic meter of volume ($m^2/m^3$), up to 2000 $m^2/m^3$. Preferably the surface area is between about 50 and about 500 $m^2/m^3$, Higher surface cathodes area provides more rapid removal of the metal from the solution. However, if the high surface area requires small channels the cathode can be susceptible to plugging and can be difficult to clean.

The electrically conductive material from which the cathode is formed must have a high surface area to provide for rapid removal of the metal from the solution. In operation, the aluminum reducing metal elements will pass into solution and the lead will precipitate on the high surface area electrically conductive material.

Figure 2:
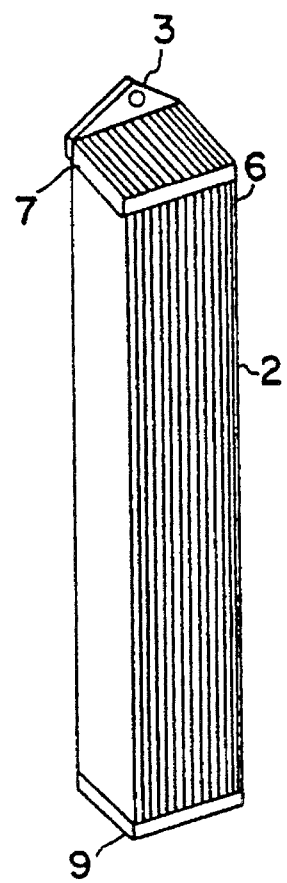
FIG. 2 is a perspective drawing of a cathode formed from thin plates of the electrical conductive material.

FIG. 2 is an isometric view of a high surface area cathode formed from plates of an electrically conductive material. In FIG. 2, the assembly comprises a plurality of thin sheets of a metal 6 arranged in a top holding portion 7 and a bottom holding portion 9 to provide for flow channels between the electrically conductive sheets 6 of material. The sheets 6 can be fabricated from a material such as stainless steel, carbon or other conductive materials as long as they have a more positive standard state reduction potential than the reducing metal elements.

The upper support 7 and the bottom support 9 are arranged so that the strips of the electroconductive material are maintained separate and provide flow channels between the individual sheets of material.

A means 8 for moving the assembly comprises a flange means and a hole in the flange means which also provides a means for electrical connection between the high surface area electrically conductive material and the reducing metal elements.

Not all metals form a suitable electrical couple between the metal to be recovered and the reducing metal element. There are known surface effects and over-voltage effects which require that the standard state reduction potential be greater for some reducing metal elements and the metal ions in the solution than for other pairs of metals. This can be readily determined by preparing a solution of the metal ions to be recovered and introducing a small coupon of the metal which forms the reducing metal elements in electrical communication with the electrically conductive material which is to form the cathode. If the standard state reduction potential between the metal which forms the reducing metal elements and the metal ions in solution is sufficiently great and there are no deleterious surface effects the metal ions will immediately begin precipitating on the reducing metal element and also on the electroconductive cathode material.

A cathode formed from a high surface area electroconductive material is necessary to provide a high rate of precipitation of the metal and makes the apparatus of the present invention particularly useful for recovering metal from a solution. The apparatus of the present invention can reduce the concentration of particular metal ions to relatively low levels in short periods of time.

Figure 4:
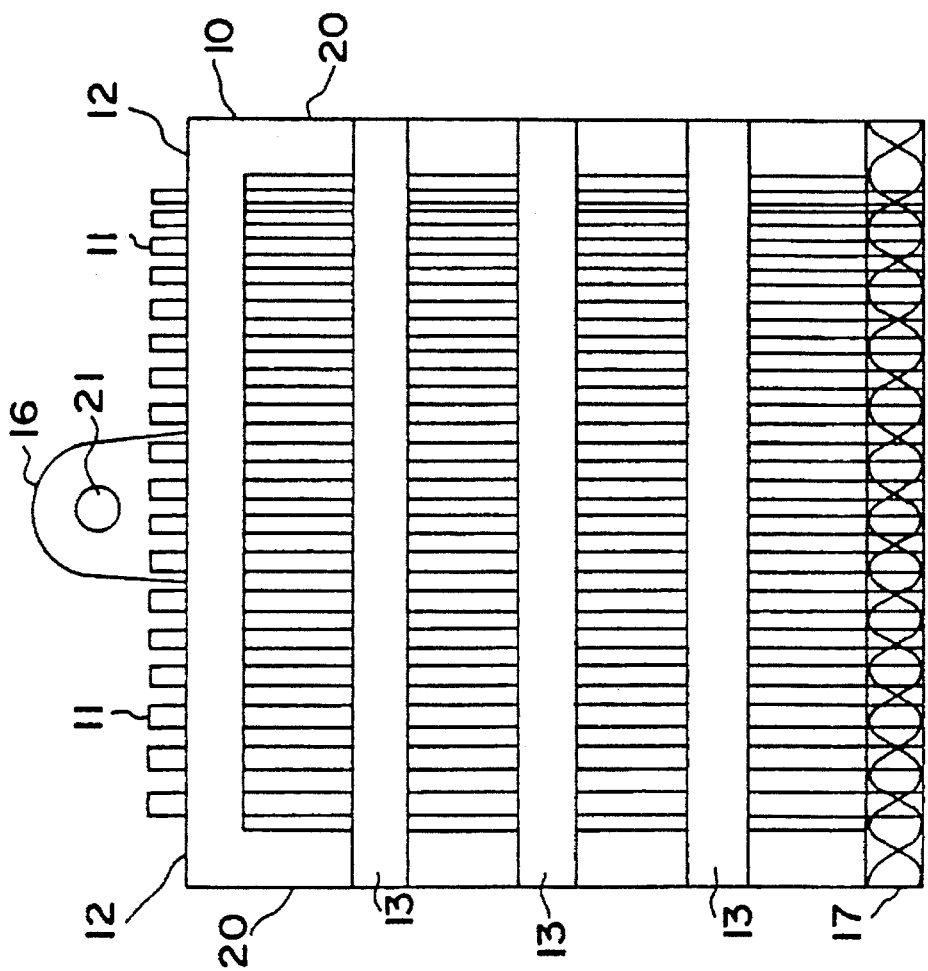
FIG. 4 is a front view of an embodiment of a metal recovery assembly.
Figure 3:
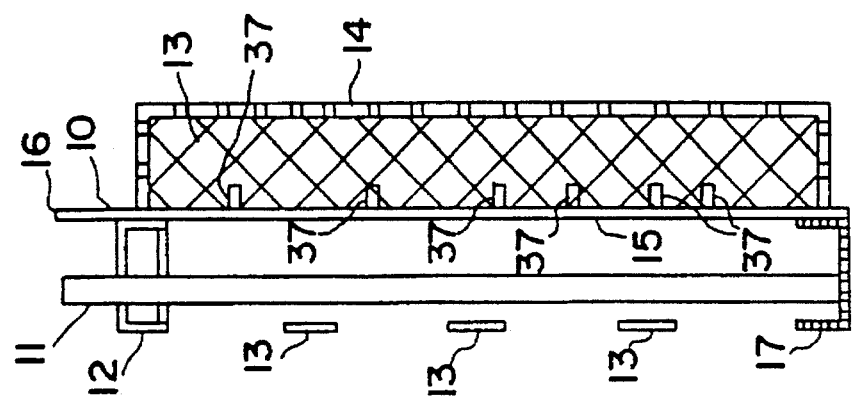
FIG. 3 is a view in section of metal recovery assembly of FIG. 4.
Figure 5:
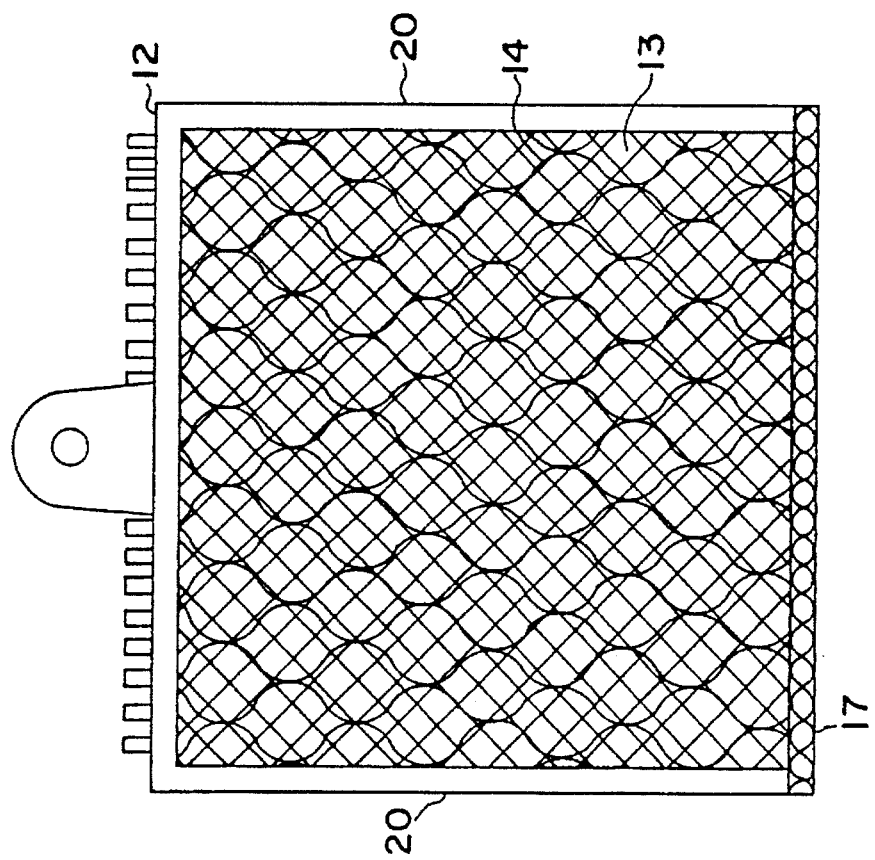
FIG. 5 is a rear view of the metal recovery assembly.

FIG. 3 is a cross-sectional view of a preferred embodiment of a metal recovery assembly of the invention. FIG. 4 is a front view of the metal recovery assembly and FIG. 5 is a back view of the metal recovery assembly shown in cross section in FIG. 3. The same numbers denote the elements of the assembly in FIGS. 3, 4, 5 and 6 when they refer to the same element.

In FIG. 3, the metal recovery assembly 10 comprises reducing metal elements 11 in the form of rods which are supported by a reducing metal element support assembly 12 which comprises two parallel metallic pieces with inline holes of a diameter such that rods 11 can easily slide through the two holes. The metal rods 11 rest on a rod support member 17 which is formed from materials such as an expanded metal, a foraminous plate or the like. The rod support element 17 is designed to permit flow of liquid around the bottom of the rods and to provide means for permitting any precipitate which may form on the rods 11 and release therefrom to fall through the rod support means 17 and prevent a buildup of any precipitated material. Support means 17 is generally formed from a foraminous material such as a perforated plate, expanded metal and the like. The metal recovery assembly also comprises rod support means 13 which extend across the outside of the assembly. The support means 13 are intended to contain the rods in the assembly should they become corroded and break. Reducing metal element support assembly 12 and the rod support element 17 are supported by side frame members 20. Side frame members 20 connect and support the rod support assembly 12 and the rod support element 17. The frame members 20 are connected to the rod support members 13 and along with the reducing metal element support assembly 12 and the rod support 17 form an assembly for holding the metal rods 11.

A foraminous structure such as an expanded metal or perforated plate holding structure 14 is connected to the support members 12, 17 and 20 and forms a cage like arrangement for holding a high surface area metal mesh or gauze in place. A metal mesh support member 15 is arranged between the reducing metal element support assembly 12 and the rod support element 17. The metal mesh support member 15 comprises projections 37 arranged to project into the metal mesh, screen or gauze and prevent it from slipping or slumping to the bottom of the support 14. As all the components of the assembly 10 are fabricated from electrically conductive materials, the reducing metal elements are assured of being in electrical communication with the high surface area cathode material. In addition, the high surface area cathode material is permitted to contact the reducing metal elements directly, also assuring electrical communication.

The support 14 is a formaminous structure which provides for ready flow of a solution through the high surface area electrically conductive material. Holding structure 14 can be formed from a formaminous plate, expanded metal and the like. The assembly 10 has a flange means 16 with a hole 21 therein to aid in lifting the assembly. The assembly can be removed from contact with the solution containing the ions of the metal to be recovered, and contacted with a stream of water to remove the precipitated metal from the high surface area electroconductive material and the reducing metal elements. At the time the precipitated metal is removed from the high surface area electroconductive material, reducing metal elements which have been diminished in size in sufficient amount to make the assembly no longer as efficient as it was initially, can be replaced with new reducing metal elements. After the assembly is cleaned and any reducing metal elements which require replacement have been replaced, the assembly can be moved back into contact with the solution containing the ions to be recovered.

In FIG. 5, the support 14 is formed from an expanded metal and contains a packing of multiple layers of stainless steel wire mesh. The support members 12, 13, 14, 15, 17, and 20 can be formed from materials such as iron. The metal will not corrode as long as there is a sufficient amount of a reducing metal element having a more negative standard state reduction potential than iron present in the system and in electrical communication with the elements. The reducing metal elements act as a sacrificial protective anode for the iron. However, the preferred material of construction for support 14 is stainless steel.

The assembly may not require a support member 14 which covers the entire back of the assembly if the high surface area electroconductive material comprises thin sheets of an electrically conductive material. In that case, the thin sheets merely require support at the top and the bottom with the flow channels facing the reducing metal elements.

It is preferred that the assembly be arranged so that the flow of the solution containing the ions of the metal to be recovered is not unduly impeded in passing through the assembly. Therefore, the assembly should comprise as large an amount of open area as possible commensurate with the high surface area of the electrically conductive material. A preferred material to be utilized for the high surface area cathode is a mesh comprising multiple layers or plies of woven crimped stainless steel wire. Typical wire has a diameter of 0.006 inches, and is crimped to increase the surface area per unit of effective length. In principle, any number of plies can be used in a metal recovery assembly, but less than about 6 plies gives less surface area than desireable, and more than about 30 plies makes the assembly difficult to clean of deposited metal. A preferred number of wire mesh plies per assembly is from about 12 up to about 24.

The reducing metal elements are generally more massive than the high surface area electrically conductive material since the reducing metal elements slowly pass into solution and must be periodically replaced. Round bars with a diameter of from about ½ inch to about 2 inches have been found suitable, however, bars of other cross sections can also be utilized. Round bars are utilized because of their ready availability and low cost.

The anodes comprising reducing metal elements are arranged in close proximity to cathodes of high surface area electroconductive materials. The close proximity of the anodes comprising the reducing metal elements to the cathodes of high surface area electroconductive material provides for a more rapid removal of the metal ions from the solution. It is preferred that the reducing metal elements be in direct contact with the high surface area electroconductive material, but in any event should not be separated by more than about 6 inches. An additional advantage of placing the two components close together is that it increases the number of assemblies that can be utilized in a given vessel, and thus increases the extent of recovery of metal from solution.

The reducing metal elements must be in electrical communication with the high surface area electrically conductive material. This can be accomplished by providing a direct electrical path between the reducing metal elements and the high surface area electrically conductive material. However, the frame of the assembly can be fabricated from electrically conductive materials and the mounting of the reducing metal elements in the frame along with the high surface area electrically conductive material provides an electrical coupling through the frame between the reducing metal elements anode and the high surface area electrically conductive material cathode. If there is no electrical communication between the reducing metal elements and the high surface area electroconductive material cathode, the metal will precipitate on the reducing metal elements and not in the high surface area electrically conductive material. This provides essentially a cementation process wherein the metal ions precipitate only on the surface of the reducing metal element. However, the surface of the reducing metal elements is relatively small and the process is much slower and less effective for reducing the concentration of the metal ions to a low level.

Depending upon the metal ions to be recovered, the solution containing the metal ions may be acidic or alkaline. Typically, the pH is less than about 5. Preferably, the solution is at pH in a range from about 1 to about 3.5, and more preferably about pH 2. Preferably, the acid comprises a strong mineral acid of concentration between about 0.01 molar and about 1 molar. Additionally, the solution may contain a salt of the strong mineral acid, preferably between about 1 wt/wt % and about 20 wt/wt %. Most preferably, the strong mineral acid is hydrochloric acid and the salt is calcium chloride. Such solutions are especially useful in leaching heavy metals from contaminated soil, and are described in copending application 07/771,286, filed Oct. 3, 1991.

As discussed above, the reducing metal elements must have a more negative standard state reduction potential than the metal to be recovered. Under the circumstances, the anode comprising the reducing metal elements pass into solution and the metal to be recovered precipitates on the high surface area electroconductive material cathodes. Preferred reducing metals include magnesium, aluminum and iron. Reducing metal elements formed from aluminum have been shown to be highly effective for reducing the content of lead in acidic aqueous solutions containing lead. The assembly is particularly useful for recovering metals such as lead, copper, tin, silver, mercury, antimony, and the like from aqueous solutions. Other metals such as uranium can also be removed from solution. In this case, the metal in solution is not precipitated as the elemental metal, but is reduced from a soluble form such as $UO_2^{+2}$ in solution to an insoluble form such as $UO_2$, which is precipitated on the high surface area electrically conductive material.

Figure 6:
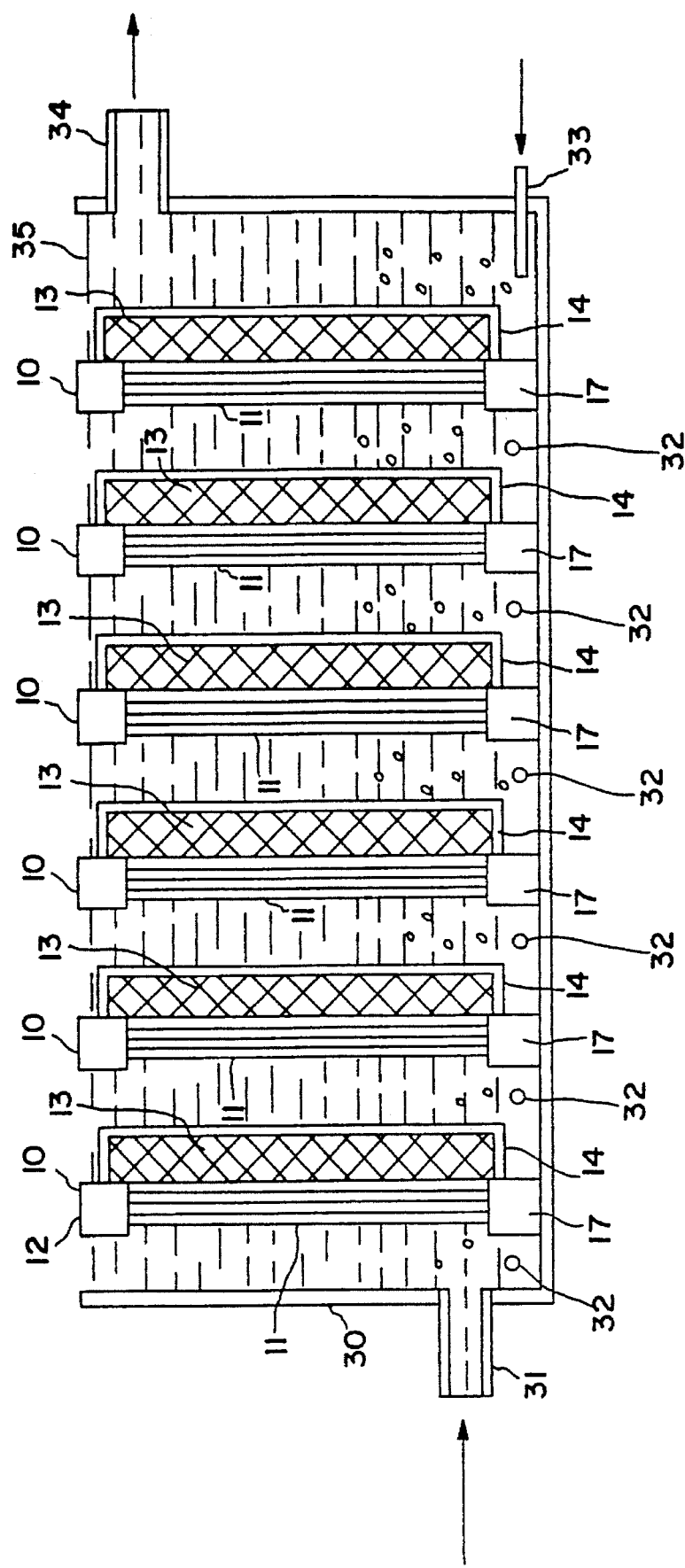
FIG. 6 is a view in section of metal recovery assemblies is arranged in a vessel which vessel is arranged to pass the aqueous solution through the metal recovery assemblies in series.

FIG. 6 is a cross section of a metal recovery apparatus comprising a plurality (six shown) of metal recovery assemblies arranged in a vessel through which acidic solution containing the ions of metal to be recovered passes through and around the metal recovery assemblies.

As shown in FIG. 6, a vessel 30 which is preferably formed from an electrically conductive material but can be formed from a non-conductive material, contains an inlet means 31 through which the solution containing the ions of the metal to be recovered enters the recovery zone of the vessel. The vessel has arranged therein a plurality of metal recovery assemblies comprising metal rods 11 (reducing metal elements) mounted in rod supports 12 and 17 and having an expanded metal holding structure 14 surrounding a packing of stainless steel wire mesh 13. The aqueous solution enters the vessel 30 through feed nozzle 31 and passes through the metal recovery assemblies and leaves the vessel through exit nozzle 34. The liquid in the vessel containing the metal to be recovered is shown as 35. Passing the liquid through the series of the recovery assemblies results in a decrease in concentration of the metal content of the metal to be recovered, and deposition of the metal on the metal recovery assemblies. A portion of the deposited metal may adhere loosely to the metal recovery assemblies, and fall to the bottom of the vessel as a sludge.

As shown in FIG. 6, vessel 30 comprises gas sparging means 32 and 33. It has been discovered that the addition of a gas under the surface of the liquid and preferably near the bottom of the vessel provides for a more rapid removal of the ions of the metal to be recovered from the aqueous solution. The gas can be air, nitrogen, and the like. It is believed that gas sparging enhances the efficiency of metal removal by causing mixing of the liquid between metal removal assemblies, thus preventing channeling or short-circuiting in the vessel, and by causing agitation of liquid within metal removal assemblies, thus enhancing the contact between the liquid and the high surface area electroconductive material.

The vessel 30 is preferably made from an electrically conductive metal such as stainless steel; however, a vessel formed from a non-conductive material can also be used. If a non-conductive vessel is used, it is preferred to place a sheet of electrically conductive material on the inside bottom of the vessel. The metal removal assemblies rest on this sheet, making electrical contact, so that precipitated metal which falls to the floor of the vessel is prevented from redissolving. In addition, it is preferred that a non-electrically conductive vessel have means such as bus bars for electrically connecting the metal removal assemblies. In the case where anodes and cathodes do not comprise a unitary structure, such electrical connection between anode and cathode must be made. Forming the container 30 from an electrically conductive material assures that all of the metal recovery assemblies or anodes and cathodes are in electrical contact with each other and with the vessel so that corrosion of the system can be substantially eliminated and the metal can be recovered most effectively.

Figure 7:
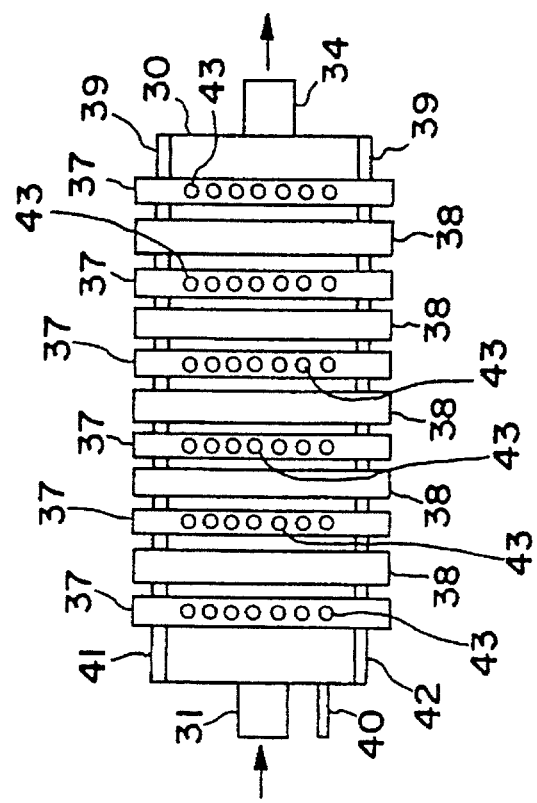
FIG. 7 is a top plan view of an arrangement wherein the anode and cathode are individual structures arranged in electrical communication in a vessel.

FIG. 7 is a top plan view of an embodiment of the invention which comprises vessel 30 which is preferably fabricated from a metal but can be fabricated from a non-electrically conductive material such as a fiberglass resin composite. The vessel 30 has an inlet nozzle 31 and an outlet nozzle 34 for introducing the solution containing the metal ions and for withdrawing the solution with the reduced content of the metal which was recovered and a gas inlet 40 for introducing a sparging gas. The vessel has bus bars arranged on the top of sides 41 and 42 of the vessel. The anodes 37 comprising reducing metal elements 43 having a more negative standard state reduction potential than the metal to be recovered are mounted on the bus bars 39 which extend along the top edges of sides 41 and 42 of vessel 30. The anodes are arranged so that the reducing metal elements 43 are in electrical communication with the bus bars 39. This can be done by forming the portion of the anode 37 which supports the reducing metal elements 43 from an electrically conductive material or providing a separate electric path connecting the reducing metal elements 43 and the bus bar 39.

The cathodes 38 comprises the high surface area electrically conductive material with a standard state reduction potential more positive than the reducing metal elements, and a support for the electrically conductive material. The cathodes 38 are mounted in electrical contact with the bus bars 39 and the cathodes 38 are formed from an electrically conductive material or have a means (not shown) for assuring electrical communication between the high surface area electrical conductive material in the cathode 38 with the bus bars 39.

The electrical communication between the reducing metal elements of the anode 37 with the high surface area material cathode 38 is provided through the bus bars 39 and the electrical pathways provided by the anode 37 and cathode 38.

The arrangement in which the anode and cathode do not comprise a unitary structure is advantageous in that the anodes and cathodes can be separately removed from the vessel for replacement of reducing metal elements or cleaning of the high surface area material. However, a unitary structure is preferred because it gives closer proximity of anodes and cathodes, and the more compact assemblies allow more reactive surface area to be placed in a vessel of given volume. In turn, increased total surface area gives faster and more complete metal removal.

The effectiveness of the metal recovery assemblies of the present invention for reducing the content of metal ions in the solution can be readily seen from the following examples.

EXAMPLE 1

An aluminum rod was connected through an electrical wire by means of alligator clips to a stainless steel rod. The two rods interlinked by the electrical connection were dipped into a solution containing lead ions at a pH of about 2. Lead began to precipitate from the solution on the stainless steel rod immediately upon introduction into the solution. A small amount of precipitate also formed on the aluminum rod.

The following experiments were conducted with a cell modified for galvanic operation. The cell was made from a non-electrical conductive material. The inside dimensions of the cell were 39 inches long, 8 inches wide and 10 inches deep. An inlet was positioned at the center of one end and a weir box was attached at the exit end. The height of the weir was 7¾ inches above the cell floor. An outlet was positioned near the bottom of the weir box. When the cell was filled the cell held about 11 gallons of solution. Nine cathode assemblies were arranged in the cell. Each comprised a plurality of plies of crimped and woven stainless steel wire mesh 8 inches wide by 10 inches deep, attached with stainless steel wire to a steel frame. The steel frame was bolted to a steel cross piece which fit into one of two bus bars running the length of the top of the cell. Alternating with the cathodes were ten anodes each consisting of a plurality of ⅜ inch or ½ inch diameter aluminum rods 14 inches long affixed at the top with copper wire to a steel cross piece which fit into the bus bars. The bus bars were connected with copper wire to assure flow of electricity between the anodes and the cathodes.

EXAMPLE 2

The cell was filled with a solution containing 50 grams/liter $CaCl_2$ at a pH of 2.0. The cathodes contained twelve plies of a wire mesh and each anode row contained two, ⅜ inch diameter, aluminum rods. The solution was circulated through the cell by pumping the solution directly from the weir overflow back into the cell inlet at a rate of 2.5 gallons per minute. Samples were taken at the overflow weir, filtered through a 0.45 micron filter pad, and analyzed for lead. The weir overflow was also monitored for pH. The data presented in table 1 include the average number of cathodes that the solution passed through based on the flow rate and total solution volume. The average removal rate in percent per cathode, was calculated according to the formula:

$$\text{Removal Rate per Cathode} = \left[ 1.0 - \sqrt[n]{\frac{(Pb)_{init}}{(Pb)_{final}}} \right] \times 100$$

where "n" is the average number of cathodes the solution has passed through, and $Pb_{init}$ and $Pb_{final}$ are the lead concentrations before and after, respectively, passing through "n" cathodes.

TABLE 1

| Time, min. | pH | Pb (ppm) | No. Cathodes Solution Passed Through | Removal Rate, %/Cathode |
|---|---|---|---|---|
| 0 | 2.07 | 308 | 0 | — |
| 4 | 2.14 | 271 | 8.2 | 1.2% |
| 9 | 2.16 | 233 | 18.5 | 1.5% |
| 12 | 2.18 | 186 | 24.6 | 3.6% |
| 17 | — | 136 | 34.9 | 3.0% |
| 24 | 2.23 | 76 | 49 | 4.0% |

The example shows that lead is consistently removed from solution by exposing the solution to a combination of aluminum anodes and high surface area steel cathodes.

EXAMPLE 3

The solution from Example 2 was removed from the cell. Additional $PbCl_2$ was added, the pH was adjusted with concentrated HCl to pH 2.0, and the solution returned to the cell. The procedure of Example 2 was repeated except that the solution was circulated through the cell at a rate of 1.2 gallons per minute. The result of the experiment are shown in Table 2.

TABLE 2

| Time, min. | pH | Pb (ppm) | No. Cathodes Solution Passed Through | Removal Rate, %/Cathode |
|---|---|---|---|---|
| 0 | 2.03 | 299 | 0 | — |
| 8 | 2.06 | 183 | 7.8 | 6.1% |
| 16 | 2.09 | 112 | 15.7 | 6.0% |
| 24 | 2.13 | 65 | 23.5 | 6.7% |
| 32 | 2.15 | 36 | 31.4 | 7.2% |
| 48 | 2.22 | 10.5 | 47 | 7.6% |

The example shows that when the flow rate is reduced, the rate of removal of lead from the solution per cathode contact is increased.

EXAMPLE 4

The solution used in Example 3 was removed from the cell, additional $PbCl_2$ was added to the solution, and the pH of the solution adjusted to 2.0 and returned to the cell. The number of anodes in each anode row was increased from 2 to 9. The solution was pumped through the cell at the rate of 1.2 gallons per minute. Table 3 reports the results of the experiment.

TABLE 3

| Time, min. | pH | Pb (ppm) | No. Cathodes Solution Passed Through | Removal Rate, %/Cathode |
|---|---|---|---|---|
| 0 | 2.05 | 277 | 0 | — |
| 8 | 2.11 | 140 | 7.8 | 8.4 |
| 16 | 2.17 | 79.2 | 15.7 | 7.1 |
| 24 | 2.21 | 38.6 | 23.5 | 8.8 |
| 32 | 2.25 | 17.4 | 31.4 | 9.6 |
| 48 | 2.38 | 4.3 | 47.0 | 8.7 |

Table 3 shows that increasing the number of anodes from 2 to 9 increases the rate at which the lead is removed from the solution.

EXAMPLE 5

The procedure of Example 4 was repeated except that the bottom of the cell was lined with a stainless steel plate. Both the aluminum rods and the wire mesh contacted the steel plate. The results of the experiment are shown in the table 4.

TABLE 4

| Time, min. | pH | Pb (ppm) | No. Cathodes Solution Passed Through | Removal Rate, %/Cathode |
|---|---|---|---|---|
| 0 | 2.01 | 353 | 0 | — |
| 8 | 2.17 | 137 | 7.8 | 11.4 |
| 16 | 2.29 | 61.8 | 15.7 | 9.6 |
| 24 | 2.40 | 28.6 | 23.5 | 9.4 |
| 32 | 2.53 | 12.3 | 31.4 | 10.1 |
| 48 | 2.81 | 3.9 | 47.0 | 7.1 |

The stainless steel plate at the bottom of the cell increased the removal rate. This experiment illustrates that a cell made of a conductive metal rather than a non-conductive material improves the cell efficiency.

EXAMPLE 6

The procedure of Example 5 was repeated, except that the solution was circulated through the cell at a rate of 1.7 gallons per minute. The cell was also modified to provide sparging tubes positioned at the bottom of the cell downstream from each cathode. The sparging tubes contained 1/16 inch holes drilled every 0.75 inch on the downstream side of the tube. Air was bubbled through the cell at the rate of 90 ft$^3$/min. The results of the experiment are reported in Table 5. As shown in Table 5, sparging increases the rate of removal of the lead from the solution, allowing the concentration of lead in solution to be reduced to less than 1 ppm.

TABLE 5

| Time, min. | pH | Pb (ppm) | No. Cathodes Solution Passed Through | Removal Rate, %/Cathode |
| --- | --- | --- | --- | --- |
| 0 | 2.13 | 190 | 0 | — |
| 8 | 2.60 | 23.7 | 11 | 17.2 |
| 16 | 3.52 | 3.3 | 22 | 16.4 |
| 24 | 3.77 | 0.9 | 33 | 11.1 |
| 32 | 3.85 | 0.5 | 45 | 5.2 |
| 48 | 3.90 | 0.3 | 67 | 2 |

EXAMPLE 7

The procedure of Example 5 was repeated except that nitrogen was sparged into the cell instead of air. In addition, the number of wire mesh plies in each cathode was increased to 24. The results of the experiment are shown in Table 6.

TABLE 6

| Time, min. | pH | Pb (ppm) | No. Cathodes Solution Passed Through | Removal Rate, %/Cathode |
| --- | --- | --- | --- | --- |
| 0 | 2.07 | 315 | 0 | — |
| 8 | 2.94 | 49.9 | 11 | 15.4 |
| 16 | 3.53 | 5.1 | 22 | 18.7 |
| 24 | 3.68 | 1.0 | 33 | 13.8 |
| 32 | 3.76 | 0.4 | 45 | 8.0 |
| 48 | 3.83 | 0.3 | 67 | 1.3 |

The use of nitrogen as a sparging gas with the increase in the number of mesh plies increased the rate at which the metal was moved from the solution and permitted a reduction in lead concentration to less than 1 ppm.

EXAMPLE 8

The cell as described in Example 6 was used to carry out the following experiment. The solution leaving the cell was directed to a holding tank where lead chloride was continuously added and the pH adjusted to 2. The adjusted solution was continuously pumped into the inlet port of the cell. Initially, the solution flow rate was 1.7 gallons per minute. Simultaneous samples were taken at the cell inlet and the overflow weir, filtered and analyzed for lead. After a period of time, the flow rate was increased to 2.3 gallons per minute and then further increased to 2.8 gallons per minute. The results of the experiment are shown in table 7. The results of the experiment as shown in table 7 indicate that the system can remove lead from a lead containing solution consistently at a relatively high rate. At the end of the experiment, the anodes and cathodes were removed from the cell. They contained a large quantity of a dark gray lead deposit. The dark gray lead deposit was readily removed from the anodes and cathodes with a high pressure water spray.

TABLE 7

| Time, min. | Inlet Pb, ppm | Outlet Pb, ppm | Outlet pH | Removal Rate, %/Cathode |
| --- | --- | --- | --- | --- |
| 1.7 GPM | | | | |
| 60 | 37.9 | 6.6 | 3.05 | 17.7 |
| 90 | 27.7 | 4.5 | 2.80 | 18.3 |
| 120 | 26.4 | 4.0 | 2.59 | 18.9 |
| 2.3 GPM | | | | |
| 150 | 37.8 | 6.1 | 2.46 | 18.3 |
| 180 | 39.5 | 6.2 | 2.44 | 18.6 |
| 210 | 39.1 | 5.9 | 2.41 | 19.0 |
| 240 | 37.3 | 5.2 | 2.38 | 19.7 |
| 2.8 GPM | | | | |
| 270 | 39.9 | 7.0 | 2.31 | 17.6 |
| 300 | 38.4 | 6.7 | 2.29 | 17.6 |
| 315 | 37.6 | 6.6 | 2.26 | 17.6 |

EXAMPLE 9

The procedure of Example 5 was repeated, with the following changes. The cathodes were modified by attaching seven 3/8 inch diameter aluminum rods directly to the cathode frame using copper wire. The separate anode rows were removed. A solution was prepared to contain 5% CaCl$_2$ along with the chloride salts of lead and eight other metals, and adjusted with concentrated HCl to an initial pH of 1.8. The solution was then pumped into the cell, and pump lines were arranged for recirculation at a rate of 1.0 gallon per minute from the weir box outlet directly to cell inlet. Concentrated HCl was added to the weir box intermittently to lower the pH. Samples were taken periodically at the weir and analyzed for metal content and for pH. Results of the experiment are shown in Table 8. The data indicate that lead, copper, silver, mercury and antimony are removed under these conditions, while chromium, cadmium, zinc and nickel are not.

TABLE 8

| | Metal Concentration (ppm) | | | | | |
| --- | --- | --- | --- | --- | --- | --- |
| | Time Sample Taken (min) | | | | | |
| Metal | 0 | 11 | 24 | 36 | 44 | 55 |
| Pb | 544 | 341 | 70 | 131 | 7.1 | 3.5 |
| Ag | 3.2 | 0.8 | <0.1 | <0.1 | <0.1 | <0.1 |
| Cd | 66 | 66 | 66 | 66 | 66 | 67 |
| Cr | 73 | 80 | 84 | 84 | 83 | 83 |
| Cu | 24 | 7.7 | 0.9 | 0.3 | 0.4 | 0.4 |
| Hg | 4.3 | 0.81 | <0.1 | <0.1 | <0.1 | <0.1 |
| Ni | 41 | 43 | 43 | 43 | 43 | 42 |
| Sb | 1.4 | 1.3 | 1.1 | 0.8 | 0.84 | 0.94 |
| Zn | 75 | 80 | 81 | 86 | 83 | 80 |
| pH | 3.80 | 3.97 | 2.90 | 2.00 | 2.10 | 2.21 |

The examples and the specific embodiments shown are for illustrative purposes only and are not intended to limit the scope of the invention.

We claim:

1. An apparatus for recovering metal from an aqueous solution containing ions of the metal to be recovered, which comprises: a metal recovery assembly comprising an anode comprising a plurality of bars of a reducing metal having a more negative standard state reduction potential than the metal to be recovered and having an area to volume ratio not greater than about 422 $m^2/m^3$, arranged adjacent to and in electrical communication with a cathode comprising a high surface area electroconductive material having a more positive standard state reduction potential than the reducing metal.

2. The apparatus of claim 1 further comprising means to contact the metal recovery assembly with the solution containing ions of metal to be recovered.

3. An apparatus of claim 1 wherein the high surface area electroconductive material is in the form of filaments or wire.

4. An apparatus of claim 3 wherein the high surface area electroconductive material comprises a plurality of plies of woven stainless steel wire.

5. An apparatus of claim 1 wherein the high surface area electroconductive material is in the form of a plurality of thin sheets of electroconductive material arranged with flow channels between the sheets and the flow channels facing the reducing metal elements.

6. An apparatus of claim 1 which comprises: a vessel having an inlet and an outlet for liquid flow, a plurality of cathodes and a plurality of anodes arranged in the vessel, each cathode arranged adjacent to and in electrical communication with at least one anode.

7. An apparatus of claim 6 wherein the plurality of cathodes and plurality of anodes comprise a plurality of metal recovery assemblies, each metal recovery assembly comprising a unitary structure of an anode comprising a plurality of bars of reducing metal and a cathode arranged adjacent to and in electrical connection with the anode.

8. An apparatus of claim 7 containing at least six metal recovery assemblies.

9. An apparatus of claim 7 wherein the cathode has a surface area of from 20 $m^2/m^3$ to 200 $m^2/m^3$ based on the volume of the cathode.

10. An apparatus of claim 5 having gas sparging means for introducing a gas below a surface of a liquid in the vessel.

11. An apparatus of claim 10 wherein the gas sparging means comprise a means for introducing the gas into the vessel at a plurality of locations.

12. An apparatus of claim 10 wherein the sparging means comprises means to control the flow of gas to each of the plurality of locations.

13. An apparatus of claim 6 wherein the vessel is formed from an electrically non-conducting material.

14. An apparatus of claim 13 further comprising a plate of an electricity conducting material covering at least a portion of the bottom inside of the vessel.

15. An apparatus of claim 6 wherein the vessel is formed from an electricity conducting material.

16. An apparatus of claim 6 wherein the cathodes and anodes comprise independent structures which are arranged in the vessel with each anode arranged adjacent to at least one cathode and placed in electrical communication with the cathode by contact with an electrical conducting means.

17. An apparatus of claim 6 containing at least six anodes and at least six cathodes.

18. An apparatus of claim 1 wherein the high surface area electroconductive material is formed from stainless steel.

19. An apparatus of claim 1 wherein the reducing metal element is selected from the group consisting of aluminum, iron and magnesium.

20. An apparatus of claim 1 wherein the cathode has a surface area of from 20 $m^2/n^3$ ti 2000 $m^2/m^3$ based on the volume of the cathode.

21. An apparatus of claim 20 wherein the cathode has a surface area of from 50 $m^2/m^3$ to 500 $m^2/m^3$ based on the volume of the cathode.

22. An apparatus of claim 20 wherein the cathode has a surface area of from 50 $m^2/m^3$ to 500 $m^2/m^3$ based on the volume of the cathode.

23. An apparatus of claim 1 wherein the bars comprise bars with a circular cross section and a diameter of about ⅜ inch to about 2 inches.

24. A process for recovering a metal from an aqueous solution of the metal which comprises contacting the solution with the apparatus of claim 1.

25. A process of claim 24 wherein the aqueous solution of the metal comprises a strong mineral acid at a concentration between about 0.01 molar and about 1 molar, and a salt of said strong mineral acid at a concentration between about 1% and about 20 wt % by weight.

26. A process of claim 25 wherein the strong mineral acid is hydrochloric acid and the salt is calcium chloride.

27. A metal recovery assembly for recovering metal from an aqueous solution which comprises: an anode comprising a plurality of bars of a reducing metal having a standard state reduction potential more negative than the metal in the solution and having an area to volume ratio not greater than about 422 $m^2/m^3$; a cathode comprising a high surface area electroconductive material having a more positive standard state reduction potential than the reducing metal; a frame comprising means for supporting the anode and the cathode adjacent to and in electrical communication with each other.

28. A metal recovery assembly of claim 27 wherein the high surface area electroconductive material is formed from metal wire.

29. A process of claim 24 wherein the solution is contacted with at least one metal recovery assembly comprising a unitary structure of claim 27.

30. A process of claim 29 wherein a gas is passed through the acid solution comprising the metal to be recovered.

31. A process of claim 29 wherein the metal recovery assembly comprises a unitary structure comprising: an anode comprising a plurality of bars of reducing metal, a high-surface area electroconductive cathode and a frame having means for supporting the anode and the cathode in electrical communication and adjacent to each other.

32. A process of claim 24 wherein the reducing metal element is selected from the group consisting of aluminum, iron and magnesium.

33. A process of claim 32 wherein: the acid solution of the metal comprises between about 0.01 molar and about 1 molar hydrochloric acid and between 1 wt % and 20 wt % of calcium chloride; the reducing metal is aluminum; the high surface area electroconductive cathode comprises a plurality of plies of stainless steel wire; and the metal to be removed from solution is selected from the group consisting of lead, silver, mercury, copper, tin, uranium and antimony.

34. A process of claim 24 wherein a gas is passed through the acid solution comprising the metal to be recovered.

35. A process of claim 34 wherein a gas is passed through the acid solution at a location between at least one anode and at least one cathode.

36. A process of claim 34 wherein the gas is oxygen containing gas.

* * * * *